(12) United States Patent
Shi et al.

(10) Patent No.: US 9,918,107 B2
(45) Date of Patent: Mar. 13, 2018

(54) METHOD OF CODING AND DECODING INTEGRAL IMAGES, A DEVICE FOR CODING AND DECODING INTEGRAL IMAGES, AND CORRESPONDING COMPUTER PROGRAMS

(71) Applicant: ORANGE, Paris (FR)

(72) Inventors: Shasha Shi, Cesson Sevigne (FR); Patrick Gioia, Servon-sur-Vilaine (FR)

(73) Assignee: ORANGE, Paris (FR)

( * ) Notice: Subject to any disclaimer, the term of this patent is extended or adjusted under 35 U.S.C. 154(b) by 200 days.

(21) Appl. No.: 14/395,400

(22) PCT Filed: Apr. 12, 2013

(86) PCT No.: PCT/FR2013/050805
§ 371 (c)(1),
(2) Date: Oct. 17, 2014

(87) PCT Pub. No.: WO2013/156718
PCT Pub. Date: Oct. 24, 2013

(65) Prior Publication Data
US 2015/0131741 A1 May 14, 2015

(30) Foreign Application Priority Data
Apr. 19, 2012 (FR) .................................... 12 53592

(51) Int. Cl.
*H04N 13/02* (2006.01)
*H04N 19/63* (2014.01)
(Continued)

(52) U.S. Cl.
CPC ......... *H04N 19/63* (2014.11); *H04N 13/0003* (2013.01); *H04N 13/0048* (2013.01);
(Continued)

(58) Field of Classification Search
CPC .. H04N 1/3217; H04N 19/63; H04N 13/0003; H04N 13/0048; H04N 13/0217;
(Continued)

(56) References Cited

U.S. PATENT DOCUMENTS 6,535,629 B2 *   3/2003   McCormick ....... H04N 13/0225
                                                348/E13.01
2001/0048507 A1* 12/2001   Thomas .............. G02B 27/2214
                                                353/10

(Continued)

OTHER PUBLICATIONS

Aggoun, "Compression of 3D Integral Images Using 3D Wavelet Transform", Journal of Display Technology, Nov. 2011.*

(Continued)

*Primary Examiner* — Robert Hance
(74) *Attorney, Agent, or Firm* — David D. Brush; Westman, Champlin & Koehler, P.A.

(57) ABSTRACT

A method is provided for encoding at least one integral image representative of at least one object in perspective in a scene. The method implements the following steps: applying a discrete wavelet transform directly to the pixels of the integral image, delivering a plurality of transform coefficients; and encoding the delivered transform coefficients.

14 Claims, 7 Drawing Sheets

(51) Int. Cl.
| | |
|---|---|
| H04N 13/00 | (2018.01) |
| H04N 19/60 | (2014.01) |
| H04N 19/635 | (2014.01) |
| H04N 19/122 | (2014.01) |
| H04N 19/177 | (2014.01) |
| H04N 19/136 | (2014.01) |
| H04N 19/18 | (2014.01) |

(52) U.S. Cl.
CPC ..... *H04N 13/0217* (2013.01); *H04N 13/0228* (2013.01); *H04N 13/0235* (2013.01); *H04N 13/0242* (2013.01); *H04N 19/122* (2014.11); *H04N 19/136* (2014.11); *H04N 19/177* (2014.11); *H04N 19/18* (2014.11); *H04N 19/60* (2014.11); *H04N 19/635* (2014.11)

(58) Field of Classification Search
CPC ........... H04N 13/0228; H04N 13/0235; H04N 13/0242; H04N 19/60; H04N 19/635
See application file for complete search history.

(56) References Cited

U.S. PATENT DOCUMENTS

| | | | | |
|---|---|---|---|---|
| 2004/0218827 | A1* | 11/2004 | Cohen | G06K 9/00248 382/243 |
| 2012/0140024 | A1* | 6/2012 | Lubell | H04N 13/0022 348/36 |

OTHER PUBLICATIONS

Shasha Shi et al., "Efficient compression method for integral images using multiview video coding" 18th IEEE International Conference on Image Processing, 2011.

International Search Report and Written Opinion dated May 29, 2013 for corresponding International Application No. PCT/FR2013/050805, filed Apr. 12, 2013.

Elharhar et al., "A Hybrid Compression Method for Integral Images Uring Discrete Wavelet Transform and Discrete Cosine Transform" Journal of Display Technology, IEEE Service Center, New York, NY, US, vol. 3, No. 3, Sep. 1, 2007 (Sep. 1, 2007), pp. 321-325, XP011190656.

Singh S. et al., "DWT DCT Hybrid Scheme for Medical Image Compression" Journal of Medical Engineering & Technology, vol. 31, Jan. 1, 2007 (Jan. 1, 2007), pp. 109-122, XP008159499.

Suchitra Shrestha et al. "Hybrid DWT-DCT Algorithm for Biomedical Image and Video Compression Applications", Information Sciences Signal Processing and Their Applications (ISSPA), 2010 10th International Conference on, IEEE, Piscataway, NJ, USA, 10 May 20120 (May 10, 2010), pp. 280-283, XP031777841.

Pao-Chi Chang et al., "A Scalable Video Compression Techinique Base don Wavelet and MPEG Coding", Consumer Electronics, 1999. ICCE. International Conference on Los Angeles, CA, USA Jun. 22-24, 1999, Piscataway, NJ, USA Jun. 22, 1999 (Jun. 22, 1999), pp. 372-373, XP010346597.

Wang Q. et al., "Scalable Coding of Very High Resolution Video Using the Virtual Zerotree" IEEE Transactions on Circuits and Systems for Video Technology, IEEE Service Center, Piscataway, NJ, US, vol. 7, No. 5, Oct. 1, 1997 (Oct. 1, 1997), pp. 719-727, XP011014425.

Domanski M. et al. "Spatio-Temporal Scalability for MPEG Video Coding", IEEE Transactions on Circuits and Systems for Video Technology, IEEE Service Center, Piscataway, NJ, US, vol. 10, No. 7, Oct. 1, 2000 (Oct. 1, 2000), pp. 1088-1093, XP000961875.

Mazri M. et al., "Compression of 3D Integral Images Using Wavelet Decomposition", Visual Communications and Image Processing; Jul. 8, 2003-Jul. 11, 2003; Lugano, Jul. 8, 2003 (Jul. 8, 2003), XP030080736.

* cited by examiner

METHOD OF CODING AND DECODING INTEGRAL IMAGES, A DEVICE FOR CODING AND DECODING INTEGRAL IMAGES, AND CORRESPONDING COMPUTER PROGRAMS

CROSS REFERENCE TO RELATED APPLICATIONS

This Application is a Section 371 National Stage Application of International Application No. PCT/FR2013/050805, filed Apr. 12, 2013 and published as WO 2013/156718 A1 on Oct. 24, 2013, not in English.

FIELD OF THE INVENTION

The present invention relates in general to the field of image processing, and more precisely it relates to coding and decoding integral images and sequences of integral images.

The invention applies particularly, but not exclusively, to video coding performed in present video coders and their amendments (MPEG, H.264, H.264 SVC, H.264 MVC, etc.) or to future coders (ITU-T/VCEG (H.265) or ISO/MPEG (HEVC)), and also to the corresponding decoding.

PRIOR ART

Integral imaging is a technique that consists in representing images in relief. It is considered as being particularly promising for developing three-dimensional (3D) television, in particular because instead of proposing stereoscopic viewing of images, it proposes total parallax.

An integral image is conventionally made up of a large number of elementary images that represent the various perspectives of a scene in three dimensions. Consequently, all of those elementary images contain not only pixel information (color and brightness) relating to the scene in three dimensions, but also information relating to the directions of the light rays reflected by an object in perspective in the scene. It is by playing back such complete 3D information that the integral image can provide total parallax for the user with quasi-continuity between different viewing points, and without leading to visual discomfort.

In spite of the attractiveness of such a technique, difficulties exist in the practical implementation of integral imaging systems. For example, when certain applications require high resolution for the integral image and a large number of viewing points, it is necessary to increase not only the size of each elementary image making up the integral image, but also the number of elementary images. This gives rise to much too great an increase in the size of the integral image as constituted in that way, thereby making it necessary to compress a large volume of information when the integral image is to be coded. As a result, the compression of such integral images presents poor performance.

Several techniques propose improving the performance of integral image compression. One of them is described in the document by Shasha Shi, Patrick Gioia, and Gérard Madec entitled "Efficient compression method for integral images using multiview video coding". That document proposes transforming each integral image of a video sequence into a series of two-dimensional (2D) images referred to as subimages. A sub-image is a particular type of image that represents a 3D scene from a specific viewing angle. Each pixel of a sub-image records information relating to the light rays reflected in a given direction by an object in perspective in the scene. To this end, a series of sub-images of an integral image may be considered as being a multiview image of the scene, and as a result, a sequence of integral images may be broken down into a multiview video sequence. Said series of such images may thus be compressed using a standard coding technique such as multiview coding (MVC). This leads to integral images being coded efficiently since advantage is taken both of the spatial redundancies and of the time redundancies therein.

A drawback of the technique described in that document is that practical application puts a limit on the number of sub-images for coding by the MVC technique.

Another drawback of that technique is making systematic use of the discrete cosine transform (DCT) for converting the video signal in the time domain into frequency components. Such a transform requires the image to be subdivided beforehand into a plurality of blocks. Thus, when the image is coded, discontinuities appear at the boundaries between adjacent blocks, which discontinuities are the result of the coarse quantification of the transformed coefficients. Such discontinuities are known as block effects. They are particularly troublesome and greatly degrade the visual quality of the image as displayed after decoding.

SUMMARY OF THE INVENTION

In a first aspect, the present invention provides a method of coding at least one integral image representative of at least one object in perspective in a scene.

The coding method of the invention is remarkable in that it performs the steps consisting in:

applying a discrete wavelet transform directly to the pixels of the integral image, thereby delivering a plurality of transformed coefficients; and coding the delivered transformed coefficients.

By using a discrete wavelet transform (DWT) instead of a discrete cosine transform (DCT), it is possible to take optimum advantage of the correlation between pixels making up an integral image, thereby advantageously making it possible to eliminate the multiple spatial redundancies that exist between a plurality of neighboring pixels in an integral image.

In addition, the integral image no longer needs to be subdivided into blocks, thereby advantageously making it possible to eliminate the block effects that are inherent to applying a DCT.

Finally, the discrete wavelet transform is advantageously applied directly to the original integral image as contrasted to an integral image that has been preprocessed, i.e. an image that has previously been subdivided into a plurality of elementary images. Such a provision makes it possible to eliminate any constraint imposed by the number or the size of the elementary images that conventionally make up an integral image.

The coding of integral images is thus made more efficient, less expensive in terms of computation, and faster.

In a particular implementation, the step of applying a discrete wavelet transform is iterated a plurality of times.

Such a provision makes it possible on each iteration to eliminate the remaining spatial correlation between neighboring pixels in the coded integral image. The number of iterations is a parameter that can be set, and by way of example it may depend on the number of pixels in the integral image.

Thus, the coding of the invention is particularly flexible in use since it is applicable to an integral image of any size.

In another particular implementation, the coding of the transformed coefficients is performed in accordance with the MPEG-4 standard.

Such a provision enables integral images following one another in a sequence to be coded efficiently by taking advantage of time redundancies between them, by applying the standard MPEG-4 coding technique to these images (where MPEG is an abbreviation for moving picture experts group).

In a first variant of said other particular implementation, during said coding step, said delivered transformed coefficients are quantified directly and then submitted to entropic coding.

Such a provision corresponds to modifying the MPEG-4 standard and consists in eliminating the DCT step conventionally performed therein. It provides particularly efficient coding of integral images when the DWT coefficients that are representative of the approximation to the integral image, i.e. the low frequency coefficients, are present in small quantity.

In a second variant of said other particular implementation, among the delivered transformed coefficients:
only the delivered transformed coefficients that are representative of the approximation of the integral image are coded in accordance with the MPEG-4 standard; and
the other delivered transformed coefficients are quantified directly and then subjected to entropic coding.

Such a provision likewise corresponds to modifying the MPEG-4 standard, by using MPEG-4 coding solely for the low frequency DWT coefficients and by applying the coding of the above-mentioned first variant to all other DWT coefficients. This second variant provides particularly efficient coding of integral images when the DWT coefficients that are representative of the approximation of the integral image, i.e. the low frequency coefficients, are present in large quantity.

In corresponding manner, the invention provides a coder device for coding at least one integral image representative of at least one object in perspective in a scene, such a device being suitable for performing the above-mentioned coding method.

Such a coder device is remarkable in that it comprises:
calculation means for applying a discrete wavelet transform directly to the pixels of the integral image to deliver a plurality of transformed coefficients; and
coder means for coding the delivered transformed coefficients.

In a second aspect, the invention provides a method of decoding a data signal representative of at least one integral image that has previously been coded, the above-mentioned integral image being representative of at least one object in perspective in a scene.

Such a decoding method is remarkable in that it performs the steps consisting in:
decoding the data of the signal, to deliver a plurality of discrete wavelet transform coefficients; and
directly reconstructing the pixels of the integral image by applying an inverse discrete wavelet transform to the delivered discrete wavelet transform coefficients.

In a particular implementation, said step of applying an inverse discrete wavelet transform is iterated a plurality of times.

In another particular implementation, the decoding of the data of the signal is performed in accordance with the MPEG-4 standard.

In a first variant of said other particular implementation, during the decoding step, the delivered transformed coefficients are subjected solely to entropic decoding, and then to inverse quantification.

In a second variant of said other particular implementation, during the decoding step, from among said delivered transformed coefficients:
only the delivered transformed coefficients that are representative of the approximation of the integral image are decoded in accordance with the MPEG-4 standard; and
the other delivered transformed coefficients are subjected directly to entropic decoding, and then to inverse quantification.

In corresponding manner, the invention provides a decoder device for decoding a data signal representative of at least one integral image that has previously been coded, the above-mentioned device being suitable for performing the above-mentioned decoding method.

Such a decoder device is remarkable in that it comprises:
decoder means for decoding data of said signal to deliver a plurality of discrete wavelet transform coefficients; and
calculation means suitable for directly reconstructing the pixels of the integral image by applying an inverse discrete wavelet transform to said delivered discrete wavelet transform coefficients.

In a third aspect, the invention provides a computer program including instructions for performing:
the coding method of the invention when executed on a computer; or
the decoding method of the invention, when executed on a computer.

The invention also provides a computer program on a data medium, the program including instructions adapted to perform any one of the methods of the invention as described above.

The program may use any programming language and it may be in the form of source code, object code, or code intermediate between source code and object code, such as in a partially compiled form, or in any other desirable form.

The invention also provides a computer readable data medium including instructions of a computer program as mentioned above.

The data medium may be any entity or device capable of storing the program. For example, the medium may comprise storage means such as a read only memory (ROM), e.g. a compact disk (CD) ROM, or a microelectronic circuit ROM, or indeed magnetic recording means, e.g. a floppy disk or a hard disk.

Furthermore, the data medium may be a transmissible medium such as an electrical or optical signal suitable for being conveyed via an electrical or optical cable, by radio, or by other means. The program of the invention may in particular be downloaded from an Internet type network.

Alternatively, the data medium may be an integrated circuit in which the program is incorporated, the circuit being adapted to execute or to be used in the execution of the method in question.

The coder device, the decoding method, the decoder device, and the computer programs as mentioned above present at least the same advantages as those procured by the coding method of the present invention.

BRIEF DESCRIPTION OF THE DRAWINGS

Other characteristics and advantages appear on reading the following description of preferred implementations described with reference to the figures, in which.

DETAILED DESCRIPTION OF ILLUSTRATIVE EMBODIMENTS

An Implementation of the Coding Portion

An implementation of the invention is described below in which the coding method of the invention is used for coding a sequence of integral images.

Figure 1:
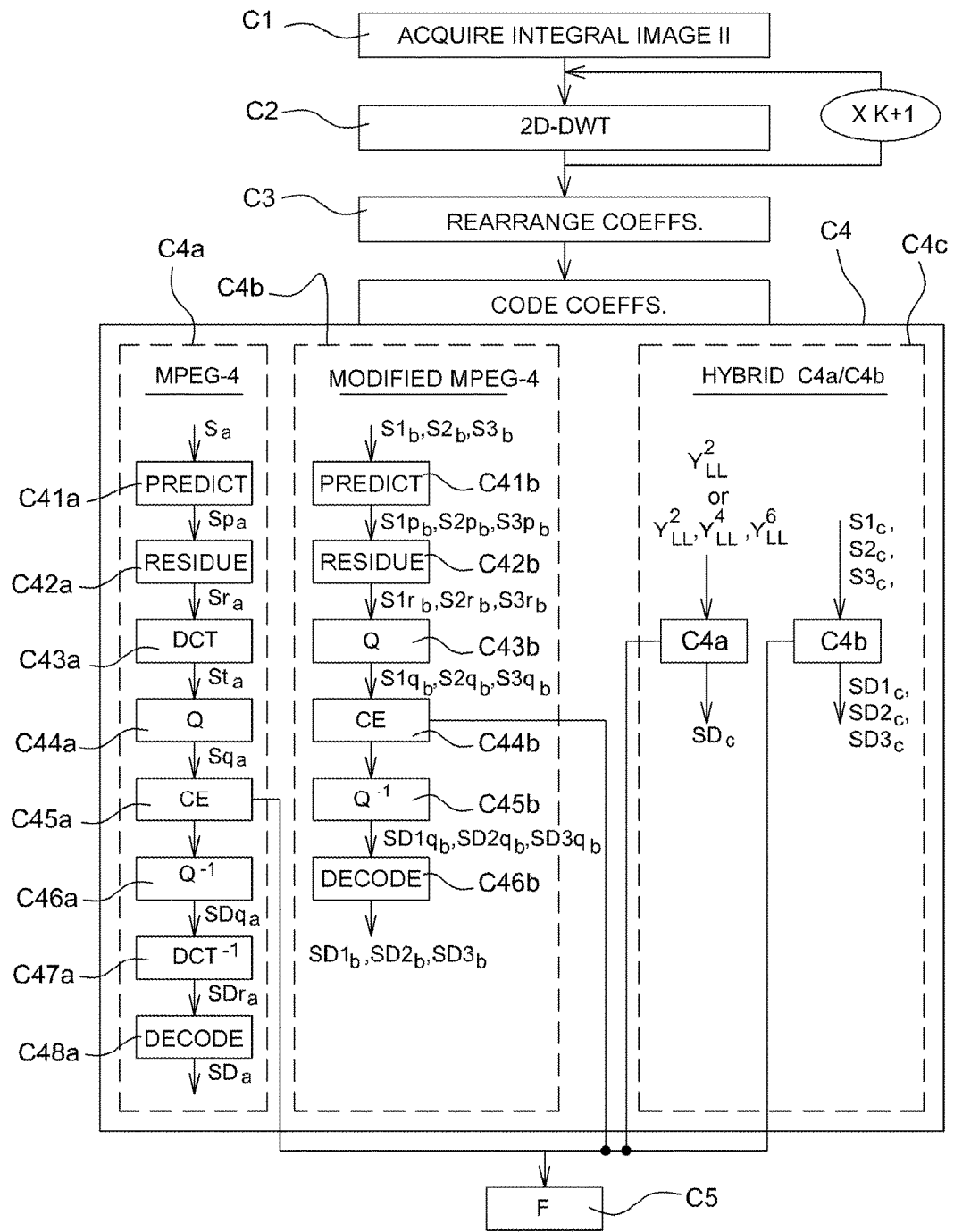
FIG. 1 shows steps of the coding method of the invention.

The coding method of the invention is shown in the form of an algorithm comprising steps C1 to C5 shown in FIG. 1.

Figure 2:
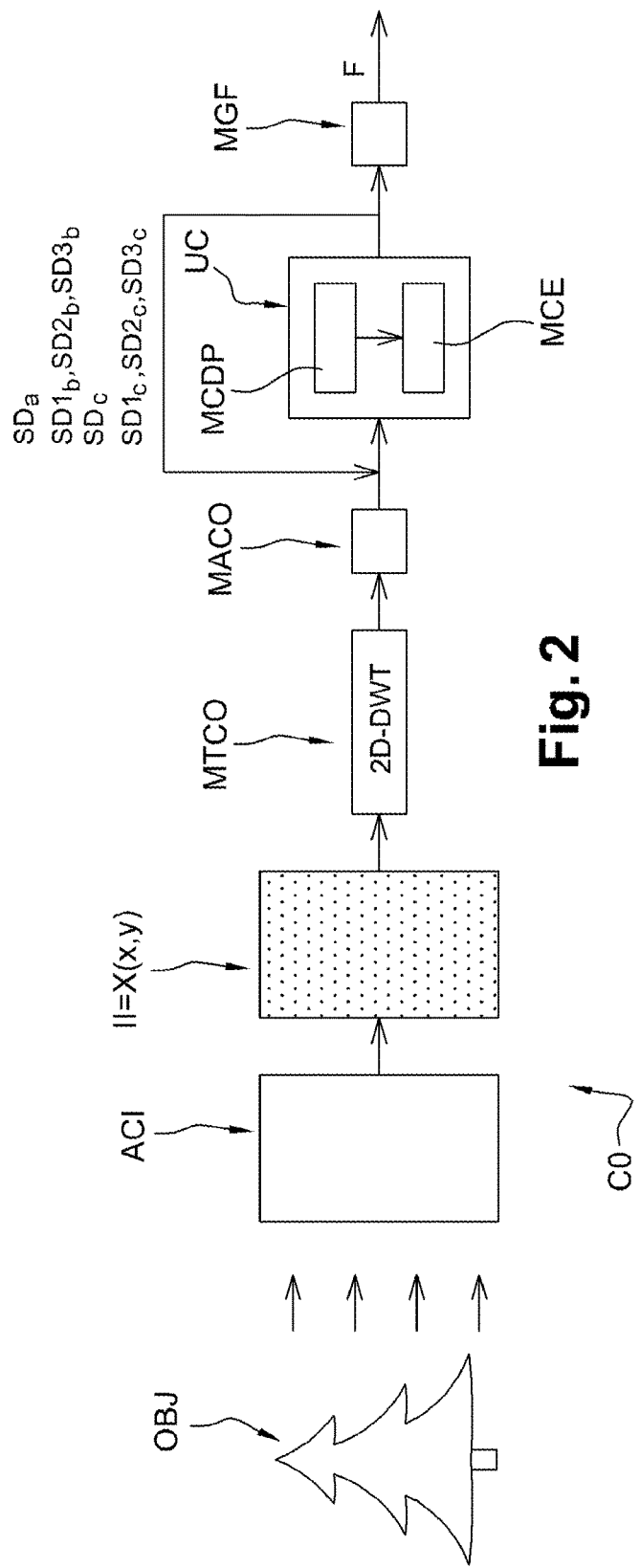
FIG. 2 shows an embodiment of a coding device of the invention.

In the implementation of the invention, the coding method of the invention is performed in a coder device CO shown in FIG. 2.

The first step C1, shown in FIG. 1, is acquiring an integral image II of the sequence of images for coding by using an image acquisition module ACI as shown in FIG. 2.

Figure 3A:
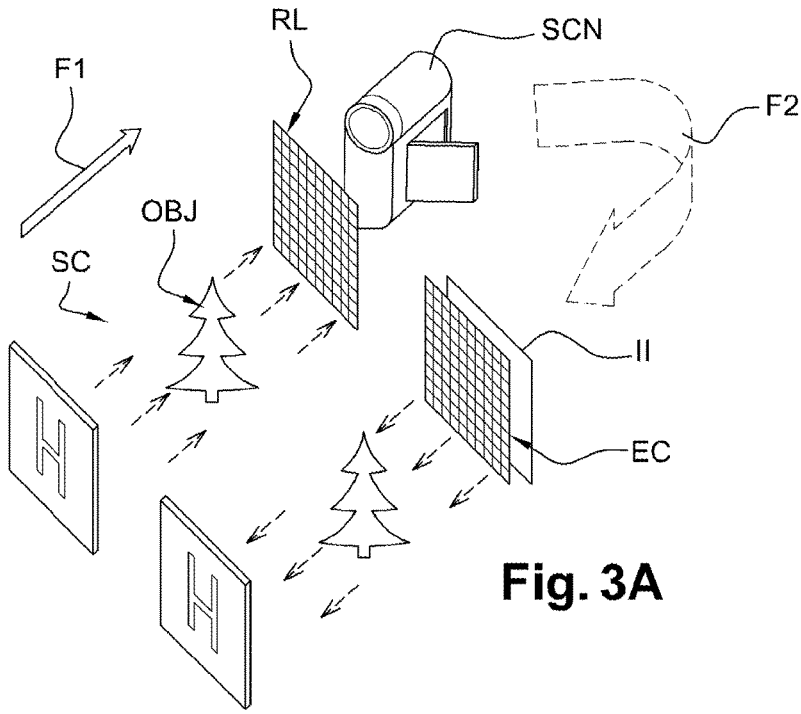
FIGS. 3A and 3B show a step of acquiring an integral image in the coding method of the invention.
Figure 3B:
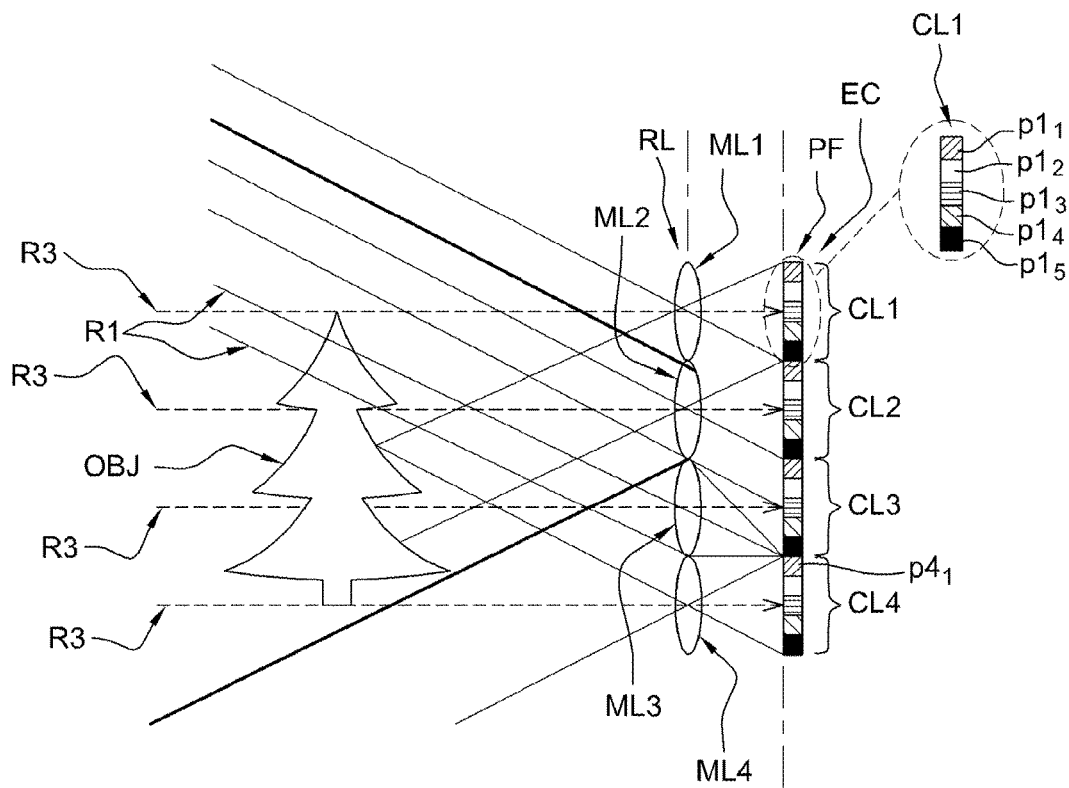

An example of acquiring an integral image is shown in FIGS. 3A and 3B.

In the example shown, the integral image II is representative of an object OBJ that is in perspective in a three-dimensional scene SC. The integral image II is acquired in the direction of arrow F1 by a two-dimensional scanner 2D of the charge-coupled device (CCD) type, which is given reference SCN in FIG. 3A, and is then reconstructed on a screen EC in the direction of arrow F2. Such acquisition is performed by means of a lens array RL that is arranged between the object OBJ and the scanner SCN. The lens array RL conventionally comprises a plurality of identical microlenses.

In the example shown in FIG. 3B, the lens array RL has only four identical microlenses ML1, ML2, ML3, and ML4, for clarity in the figure. A screen EC is arranged in the focal plane of the above-mentioned microlenses, with such a screen being suitable for playing back the integral image II to an observer. In known manner, the screen EC comprises a matrix of pixels made up of a plurality of identical cells, each constituted by a plurality of pixels of different colors. Each cell is the same size as a microlens. In the example shown in FIG. 3B, the screen EC has four pixel cells CL1, CL2, CL3, and CL4 that are arranged in correspondence with respective ones of the four microlenses ML1, ML2, ML3, and ML4. By way of example, each cell is made up of five pixels of different colors. For a given cell CLj ($1 \leq j \leq 4$), the cell contains five pixels $Pj_1$, $Pj_2$, $Pj_3$, $Pj_4$, and $Pj_5$. By way of illustration, FIG. 3B includes an enlarged view showing the composition of a cell CL1 constituted by five pixels $P1_1$, $P1_2$, $P1_3$, $P1_4$, and $P1_5$.

During acquisition, light rays coming from the object OBJ pass through each of the microlenses ML1, ML2, ML3, and ML4, and then strike the pixels of each of the cells CL1, CL2, CL3, and CL4 in the focal plane PF of said microlenses. Given the particular configuration of the lens array RL and of the pixel matrix constituting the screen EC, the light rays:

strike the pixel $P1_1$ of the cell CL1, the pixel $P2_1$ of the cell CL2, the pixel $P3_1$ of the cell CL3, and the pixel $P4_1$ of the cell CL4 at a first angle of incidence;

strike the pixel $P1_2$ of the cell CL1, the pixel $P2_2$ of the cell CL2, the pixel $P3_2$ of the cell CL3, and the pixel $P4_2$ of the cell CL4 at a second angle of incidence;

strike the pixel $P1_3$ of the cell CL1, the pixel $P2_3$ of the cell CL2, the pixel $P3_3$ of the cell CL3, and the pixel $P4_3$ of the cell CL4 at a third angle of incidence;

strike the pixel $P1_4$ of the cell CL1, the pixel $P2_4$ of the cell CL2, the pixel $P3_4$ of the cell CL3, and the pixel $P4_4$ of the cell CL4 at a fourth angle of incidence; and strike the pixel $P1_5$ of the cell CL1, the pixel $P2_5$ of the cell CL2, the pixel $P3_5$ of the cell CL3, and the pixel $P4_5$ of the cell CL4 at a fifth angle of incidence;

In known manner, each angle of incidence corresponds to a particular viewing angle at which an observer has the possibility of viewing the object OBJ in perspective. The values of these angles are limited by the value of the viewing angle of a microlens ML1, ML2, ML3, or ML4. Such a viewing angle, corresponding to that of the microlens ML2, is drawn in continuous bold lines in FIG. 3B by way of illustration.

For clarity in FIG. 3B, only two light rays with different angles of incidence are shown. In the example in FIG. 3B:

the light rays R1 strike the pixel $P4_1$ of the pixel CL4 at a certain angle, which corresponds to a particular viewing angle enabling an observer to view the object OBJ with particular perspective corresponding to said viewing angle; and the light rays R3 strike the pixel $P1_3$ of the cell CL1, the pixel $P2_3$ of the cell CL2, the pixel $P3_3$ of the cell CL3, and the pixel $P4_3$ of the cell CL4 respectively at an angle of incidence of zero.

After the acquisition step C1, an image II made up of a plurality of pixels is thus obtained. Such an image may be considered as constituting a matrix X(x,y) of pixels, in which the pixels are arranged in x rows and y columns, where x and y are positive integers.

During a following step C2 shown in FIG. 1, a discrete wavelet transform (DWT) is applied directly to the pixels of the integral image II. The step C2 is performed by a calculation module MTCO shown in FIG. 2.

Selecting such a type of transform advantageously makes it possible to eliminate multiple spatial redundancies that exist between the various neighboring pixels in the integral image II.

The DWT is of the two-dimensional (2D) type. For this purpose, the calculation module MTCO applies a DWT to a pixel row dimension of the integral image II, and then a DWT to a pixel column dimension thereof.

In the example shown, the calculation module MTCO uses the Haar wavelet transform because of its high performance, its simplicity, and its good properties for evaluating the outline of the object OBJ in the integral image II.

Figure 4:
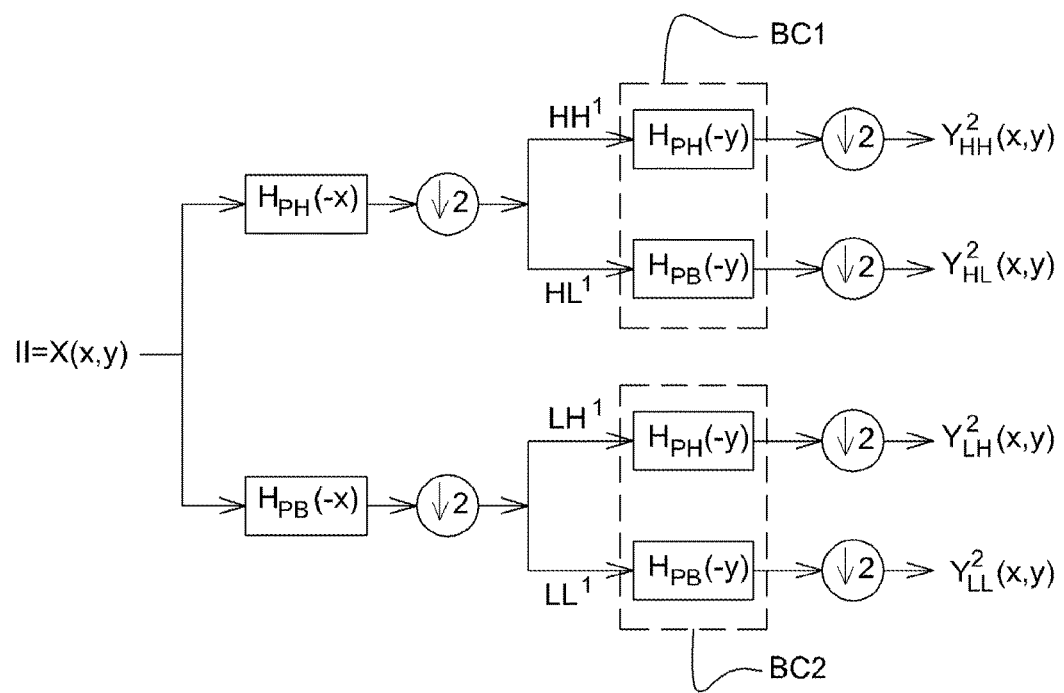
FIG. 4 shows a step of applying a discrete wavelet transform (DWT) to the acquired integral image as shown in FIG. 3A.

FIG. 4 shows how the integral image II is decomposed using the above-specified transform. A lowpass filter $H_{PB}(-x)$ and a highpass filter $H_{PH}(-x)$ are used for line-level transformation of the integral image II, and two filter banks BC1 and BC2 both containing respective lowpass filters $H_{PB}(-y)$ and highpass filters $H_{PH}(-y)$ are used for the column-level transformation of the integral image II.

The coefficients delivered by the lowpass filters $H_{PB}(-x)$ and the highpass filters $H_{PH}(-x)$ are subjected to respective subsampling by a factor of 2. The set of coefficients $HL^1$ and $HH^1$ as subsampled in this way, and likewise the set of coefficients $LH^1$ and $LL^1$ as subsampled in this way are then applied respectively as inputs to the two filter banks BC1 and BC2 each bank containing both lowpass filters $H_{PB}(-y)$ and highpass filters $H_{PH}(-y)$. The coefficients delivered by the two filter banks are subjected to respective subsampling by a factor of 2. The following four sequences of coefficients are then delivered:

- a sequence $Y^2_{LL}$ of coefficients representative of an approximation of the integral image II: these are low frequency coefficients;
- a sequence $Y^2_{LH}$ of coefficients representative of horizontal details in the integral image II;
- a sequence $Y^2_{HL}$ of coefficients representative of vertical details in the integral image II; and
- a sequence $Y^2_{HH}$ of coefficients representative of diagonal details of the integral image II.

The Haar transform is expressed mathematically by the following equation:

$$Y^2 = T \cdot X \cdot T^T$$

where $$T = \frac{1}{\sqrt{2}} \begin{pmatrix} 1 & 1 \\ 1 & -1 \end{pmatrix}$$

T being the Haar transform matrix, X being the matrix representation of the integral image II, and $Y^2$ being the transformed coefficients that are delivered in each of the above-mentioned four sequences.

According to the invention, the above-described method of decomposition using the Haar transform is iterated K+1 times (k≥1) on the low frequency coefficients obtained at each decomposition, until a predetermined level of decomposition of the integral image II is reached.

Figure 5:
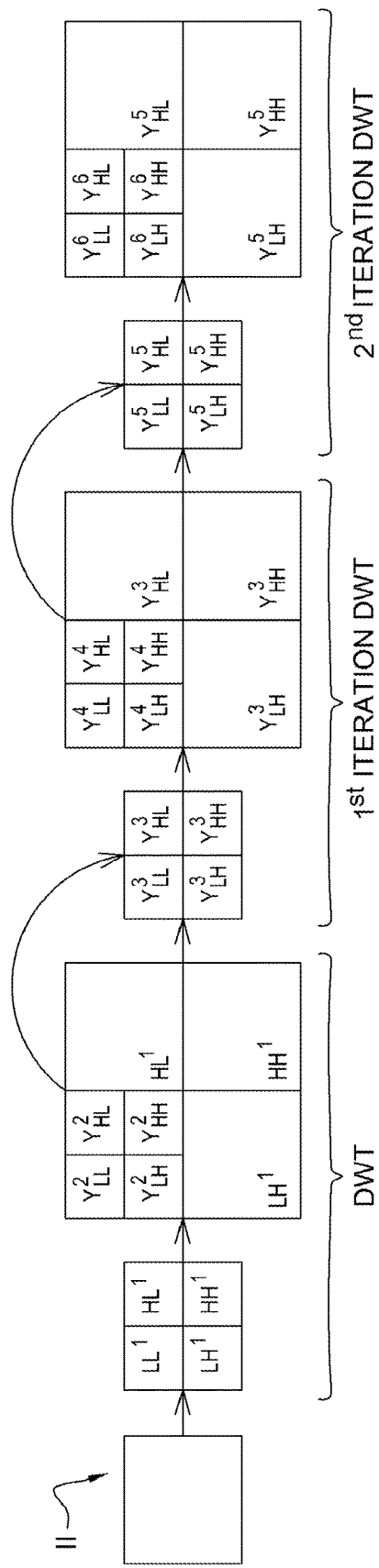
FIG. 5 shows three levels of decomposing the FIG. 3A integral image by successive applications of a DWT on the successively-acquired low-frequency coefficients.

In the example shown in FIG. 5, K=2, i.e. two iterations of the Haar transform are performed on the low frequency coefficients obtained from the preceding transform. The decomposition level is determined by the number of pixels in the integral image II. Assuming that an integral image is conventionally decomposed into elementary images each containing $2^K$ pixels, by applying a 2D wavelet decomposition K times on each set of $2^K$ pixels, it is possible to eliminate the spatial correlation that exists between neighboring pixels in an integral image II.

According to the invention, the above reasoning is applied to the original integral image II, on the low frequency coefficients that contain the redundancies between neighboring pixels in the integral image. To eliminate such redundancies, it is necessary to apply an additional DWT to the low frequency coefficients, thereby obtaining a decomposition level for the integral image II that is equal to K+1.

In the example shown in FIG. 5:
- the coefficients from the first iteration of the Haar transform are written $Y^4_{LL}$, $Y^4_{LH}$, $Y^4_{HL}$, $Y^4_{HH}$, $Y^3_{LH}$, $Y^3_{HL}$, and $Y^3_{HH}$; and
- the coefficients from the second iteration of the Haar transform are written $Y^6_{LL}$, $Y^6_{LH}$, $Y^6_{HL}$, $Y^6_{HH}$, $Y^5_{LH}$, $Y^5_{HL}$, and $Y^5_{HH}$.

At the end of the second iteration, the spatial correlations that exist between neighboring pixels in the integral image II are thus eliminated in very fine manner.

During a step C3 shown in FIG. 1, the various resulting transform coefficients from $Y^2_{LL}$, $Y^2_{LH}$, $Y^2_{HL}$, $Y^2_{HH}$, $LH^1$, $HL^1$, $HH^1$, $Y^4_{LL}$, $Y^4_{LH}$, $Y^4_{HL}$, $Y^4_{HH}$, $Y^3_{LH}$, $Y^3_{HL}$, $Y^3_{HH}$, $Y^6_{LL}$, $Y^6_{LH}$, $Y^6_{HL}$, $Y^6_{HH}$, $Y^5_{LH}$, $Y^5_{HL}$, and $Y^5_{HH}$ are subjected to rearrangement in preparation for subsequent coding. Said rearrangement step C3 is performed by a calculation software module MACO as shown in FIG. 2.

In a first example, said above-mentioned transform coefficients are organized as a single data sequence in the order in which they were obtained from the various iterations using a conventional zigzag scan such as a raster scan.

Figure 6:
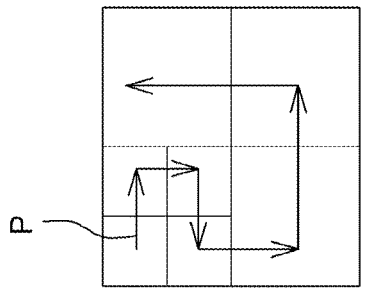
FIG. 6 shows an example of an order for scanning the transform coefficients for a decomposition level under consideration of the FIG. 3A integral image.

In a second example shown in FIG. 6, the coefficients are scanned from decomposition level K+1 to decomposition level 1 of the integral image II using the scan order represented by the arrow P in FIG. 6. For each decomposition level under consideration, the resulting transform coefficients are organized as a corresponding sequence in application of the scan shown in FIG. 6. According to the invention, at the end of step C3, three sequences of transform coefficients are obtained.

Arranging the transform coefficients in accordance with the second above-mentioned example makes it possible to improve in non-negligible manner the performance of the following steps of quantification and of entropic coding.

During a following step C4 as shown in FIG. 1, the rearranged transform coefficients are coded so as to eliminate the time redundancies that exist between the current integral image II and at least one integral image that has previously been coded and then decoded.

Such a step is performed by a coder module UC shown in FIG. 2. Said coder module UC comprises:

- a predictive coder/decoder module MCDP for use on at least one current coefficient sequence relative to at least one sequence that has previously coded and then decoded; and
- a module MCE for entropic coding of said at least one current sequence, e.g. a module of the context-adaptive binary arithmetic coding (CABAC) type.

Said predictive coder/decoder module MCDP performs a conventional predictive coding/decoding algorithm of the MPEG-4 type or as modified in accordance with the invention, as described below. In the example shown, the predictive coder/decoder module MCDP performs three different types of coding procedure, respectively referenced C4a, C4b, and C4c.

In the first procedure C4a shown in FIG. 1, the sequence of transform coefficients as rearranged in application of the first above-mentioned example, written $S_a$, is conventionally coded using the MPEG-4 technique that is well known to the person skilled in the art. Such an arrangement presents the advantage of being simple to implement since it does not require any modification of the coder/decoder module MCDP. For this purpose, during a substep C41a, the current sequence of coefficients $S_a$ is subjected to predictive coding, during which it is predicted relative to a coefficient sequence that has previously been coded and decoded.

Said above-mentioned predictive coding step enables a predicted coefficient sequence $Sp_a$ to be constructed that is an approximation of the current sequence $S_a$. Information relating to this predictive coding may subsequently be written into a stream suitable for transmission to a decoder.

During a following substep C42a, the predicted sequence $Sp_a$ is subtracted from the current sequence $S_a$ in order to produce a residual sequence $Sr_a$.

During a following substep C43a, the residual sequence $Sr_a$ is subjected to transformation using a conventional forward transformation operation, e.g. a transformation of the discrete cosine transform (DCT) type in order to produce a transformed sequence $St_a$.

During a following substep C44a, the transformed sequence $St_a$ is subjected to quantification in application of a conventional quantification operation, such as for example scalar quantification. This gives rise to a quantified coefficient sequence $Sq_a$.

During a following substep C45a, the entropic module MCE of FIG. 2 performs entropic coding of the quantified coefficient sequence $Sq_a$.

Figure 7:
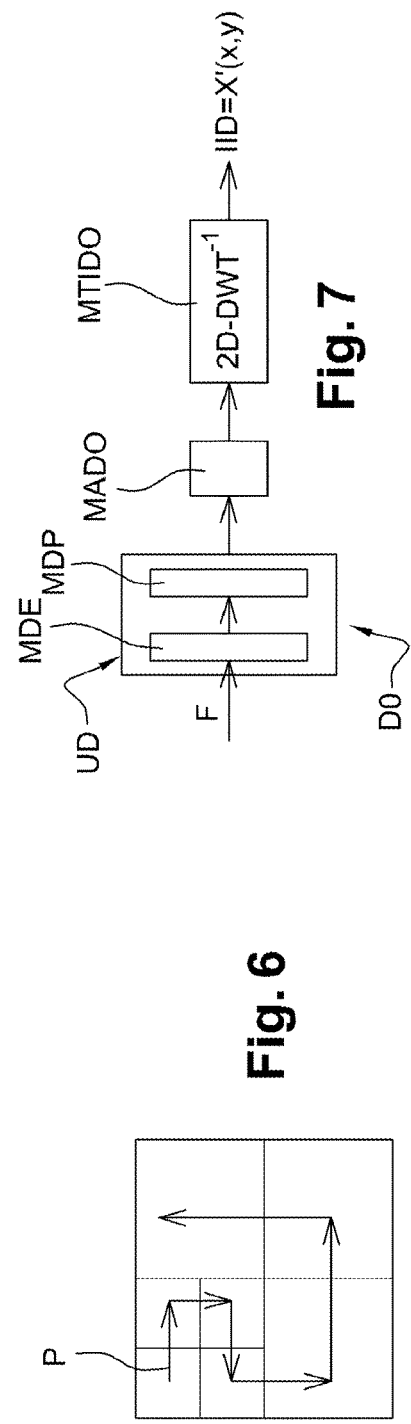
FIG. 7 shows a decoder device of the invention.

The coefficients as coded in this way are then available during a step C5 for being written into a stream F that is to be transmitted to a decoder such as the decoder DO shown in FIG. 7, after prior ordering. The step of producing such a stream is performed by a software module MGF for generating data streams, e.g. such as bits, said module being shown in FIG. 2.

During a following substep C46a, the sequence $Sq_a$ is dequantified using a conventional dequantification operation, which is the operation that is the inverse of the quantification performed in step C44a. This produces a dequantified coefficient sequence $SDq_a$.

During a following substep C47a, the dequantified coefficient sequence $SDq_a$ is subjected to inverse transformation, i.e. to the operation that is the inverse of the forward transformation performed in above-mentioned step C43a. This gives rise to a decoded residual sequence $SDr_a$.

During a following substep C48a, the decoded sequence $SD_a$ is constructed by adding the decoded residual sequence $SDr_a$ to the predicted sequence $Sp_a$. The decoded sequence $SD_a$ is thus made available for use by the coder unit UC, as shown in FIG. 2.

In the second procedure C4b shown in FIG. 1, the above-described coding is performed, with the exception of DCT step C43a, for each set of coefficients that have been transformed and then arranged by decomposition level in conformity with the second example shown in FIG. 6. As mentioned above, in the example shown, three sets of transformed coefficients $S1_b$, $S2_b$, $S3_b$ are coded in succession since there are three decomposition levels. Such a second coding procedure C4b, which constitutes a modified version of the convention MPEG-4 coding technique, is particularly advantageous to perform when the low frequency coefficients $Y^2_{LL}$, $Y^4_{LL}$, and $Y^6_{LL}$ are present in small quantity only.

For this purpose, during a substep C41b that is identical to substep C41a, the first current coefficient sequence $S1_b$ is subjected to predictive coding delivering a predicted coefficient sequence $S1p_b$ that is an approximation of the current sequence $S1_b$. The information relating to this predictive coding may subsequently be written in the stream F for transmission to the decoder DO of FIG. 7.

During a following substep C42b identical to the substep C42a, the predicted sequence $S1p_b$ is subtracted from the current sequence $S1_b$ in order to produce a residual sequence $S1r_b$.

During a following substep C43b identical to the substep C44a, the residual sequence $S1r_b$ is subjected to quantification, thereby delivering a quantified coefficient sequence $S1q_b$.

During a following substep C44b, the entropic coder module MCE of FIG. 2 performs entropic coding of the quantified coefficient sequence $S1q_b$.

The coefficients as coded in this way are then available for being written into the stream F during said step C5.

During a following substep C45b, identical to the substep C46a, the sequence $S1q_b$ is subjected to dequantification using a conventional dequantification operation, which operation is the inverse of the quantification performed in step C43b. This gives rise to a dequantified coefficient sequence $SD1q_b$.

During a following substep C46b, the decoded sequence $SD1_b$ is constructed from the sequence $SD1q_b$. The decoded sequence $SD1_b$ is thus made available for use by the coder unit UC, as shown in FIG. 2.

The second coding procedure C4b as described above is performed once more for each of the other two transformed coefficient sequences $S2_b$ and $S3_b$.

In the third procedure C4c shown in FIG. 1, only the low frequency coefficients $Y^2_{LL}$ as transformed and then arranged in accordance with the first above-mentioned example, or indeed only the low frequency coefficients $Y^2_{LL}$, $Y^4_{LL}$, $Y^6_{LL}$ as transformed and then arranged in accordance with the second above-mentioned example are subjected to a coding procedure identical to the procedure C4a. At the end of this procedure, a decoded sequence $SD_c$ is obtained and is thus made available for use by the coder unit UC, as shown in FIG. 2.

Still in the above-mentioned third procedure C4c, the coefficients other than the above low frequency coefficients are subjected to a coding procedure identical to the procedure C4b. In the first above-mentioned rearrangement example, these are the coefficients $Y^2_{LH}$, $Y^2_{HL}$, $Y^2_{HH}$, $LH^1$, $HL^1$, $HH^1$, $Y^4_{LH}$, $Y^4_{HL}$, $Y^4_{HH}$, $Y^3_{LH}$, $Y^3_{HL}$, $Y^3_{HH}$, $Y^6_{LH}$, $Y^6_{HL}$, $Y^6_{HH}$, $Y^5_{LH}$, $Y^5_{HL}$, and $Y^5_{HH}$. In the second above-mentioned example, these are the first sequence $S1c$ of coefficients $Y^2_{LH}$, $Y^2_{HL}$, $Y^2_{HH}$, $LH^1$, $HL^1$, and $HH^1$, the second sequence $S2c$ of coefficients $Y^4_{LH}$, $Y^4_{HL}$, $Y^4_{HH}$, $Y^3_{LH}$, $Y^3_{HL}$, and $Y^3_{HH}$, and the third sequence $S3c$ of coefficients $Y^6_{LH}$, $Y^6_{HL}$, $Y^6_{HH}$, $Y^5_{LH}$, $Y^5_{HL}$, and $Y^5_{HH}$. At the end of this procedure, three decoded sequences $SD1_c$, $SD2_c$, and $SD3_c$ are obtained and are thus made available for use by the coder unit UC, as shown in FIG. 2.

Such a third coding procedure C4c, which constitutes a hybrid between the conventional MPEG-4 coding technique and the MPEG-4 coding technique as modified by the invention, is particularly advantageous to perform when the low frequency coefficients $Y^2_{LL}$, $Y^4_{LL}$, and $Y^6_{LL}$ are present in large quantity.

The above-described coding method is reiterated for a plurality of integral images for coding that belong to a determined sequence.

An Implementation of the Decoding Portion

Figure 8:
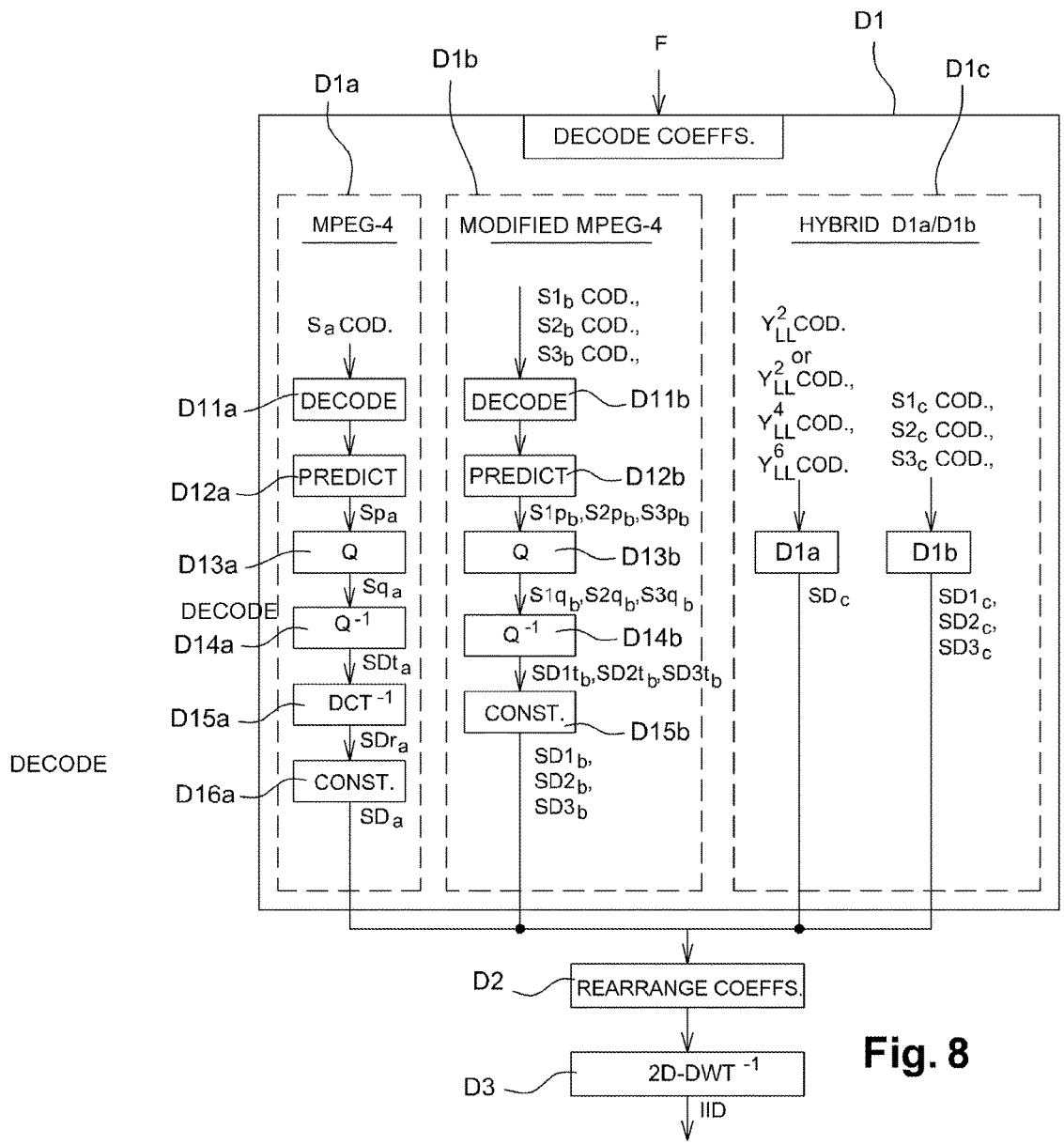
FIG. 8 shows steps in the decoding method of the invention.

With reference to FIG. 8, there follows a description of the decoding method of the invention performed in the decoder DO of FIG. 7. The decoding method of the invention is shown in the form of an algorithm comprising steps D1 to D3 shown in FIG. 8.

With reference to FIG. 8, the first decoding step D1 is decoding each of the coefficients obtained in the stream F received by the decoder DO.

Coefficient decoding is performed by a decoder unit UD as shown in FIG. 7.

As shown in greater detail in FIG. 7, the decoder unit UD comprises:
- a decoder module MDE for entropic decoding of said at least one current sequence of previously coded coefficients, e.g. a module of the CABAC type; and a decoder module MDP for predictive decoding of at least one current coefficient sequence relative to at least one previously decoded sequence.

Said predictive decoder module MDP performs a conventional predictive decoding algorithm of MPEG-4 type or an algorithm that is modified in accordance with the invention, as described below. In the example shown, the predictive decoder module MDP performs three different types of decoding procedure, given respective references D1$a$, D1$b$, and D1$c$ in FIG. 8.

In the first decoding procedure D1$a$ shown in FIG. 8, the coefficient sequence $S_a$ that was coded during the above-mentioned coding procedure C4$a$ is decoded as follows.

During a first substep D11$a$, the coefficients of the coded sequence $S_a$ are subjected to entropic decoding.

During a following substep D12$a$, the current coefficient sequence $S_a$ is subjected to predictive decoding, during which the sequence is predicted relative to a previously decoded coefficient sequence.

Said above-mentioned predictive decoding step serves to construct a predicted coefficient sequence $Sp_a$.

During a following substep D13$a$, a quantified coefficient sequence $Sq_a$ is constructed.

During a following substep D14$a$, the quantified coefficient sequence $Sq_a$ is subjected to dequantification using a conventional dequantification operation that is the operation that is the inverse of the quantification performed in above-mentioned substep C44$a$, in order to produce a decoded dequantified coefficient sequence $SDt_a$.

During a following substep D15$a$, the dequantified coefficient sequence $SDt_a$ is subjected to the inverse transformation that is the operation that is the inverse of the forward transformation performed in above-mentioned substep C43$a$. This gives rise to a decoded residue sequence $SDr_a$.

During a following substep D16$a$, the decoded sequence $SD_a$ is constructed by adding the decoded residue sequence $SDr_a$ to the predicted sequence $Sp_a$. The decoded sequence $SD_a$ is thus made available for use by the decoder unit UD.

In the second procedure D1$b$ shown in FIG. 8, the above-described decoding is performed, with the exception of the inverse DCT substep D15$a$ on each of said sequences S1$_b$, S2$_b$, and S3$_b$ of coded transformed coefficients. These are decoded in succession since they result respectively from three different decomposition levels of the image.

For this purpose, during a substep D11$b$ identical to substep D11$a$, the first current coded coefficient sequence S1$_b$ is subjected to entropic decoding.

During a following substep D12$b$, the current coefficient coded sequence S1$_b$ is subjected to predictive decoding, during which it is predicted relative to a previously decoded coefficient sequence.

Said above-mentioned predictive decoding substep serves to construct a predicted coefficient sequence S1$p_b$.

During a following substep D13$b$, a quantified coefficient sequence S1$q_b$ is constructed.

During a following substep D14$b$, the quantified coefficient sequence S1$q_a$ is dequantified in order to produce a decoded dequantified coefficient sequence SD1$t_b$.

During a following substep D15$b$, the decoded sequence SD1$_b$ is constructed from the decoded dequantified sequence SD1$t_b$. The decoded sequence SD1$_b$ is thus made available for use by the decoder unit UD of FIG. 7.

The second above-described decoding procedure D1$b$ is performed once more for each of the other two coded coefficient sequences S2$_b$ and S3$_b$.

In the third procedure D1$c$ shown in FIG. 8, only the coded low frequency coefficients $Y^2_{LL}$, or else only the coded low frequency coefficients $Y^2_{LL}$, $Y^4_{LL}$, and $Y^6_{LL}$ are subjected to a decoding procedure identical to the procedure D1$a$. At the end of this procedure, a decoded sequence $SD_c$ is obtained and is thus made available for use by the decoder unit UD as shown in FIG. 7.

Still in the third above-mentioned procedure D1$c$, the coefficients other than the above low frequency coefficients are subjected to a decoding procedure identical to the procedure D1$b$. In the first above-mentioned rearrangement example, these are the coded coefficients $Y^2_{LH}$, $Y^2_{HL}$, $Y^2_{HH}$, $LH^1$, $HL^1$, $HH^1$, $Y^4_{LH}$, $Y^4_{HL}$, $Y^4_{HH}$, $Y^3_{LH}$, $Y^3_{HL}$, $Y^3_{HH}$, $Y^6_{LH}$, $Y^6_{HL}$, $Y^6_{HH}$, $Y^5_{LH}$, $Y^5_{HL}$, and $Y^5_{HH}$. In the second above-mentioned example, these are the first coded sequence S1$c$ of coefficients $Y^2_{LH}$, $Y^2_{HL}$, $Y^2_{HH}$, $LH^1$, $HL^1$, and $HH^1$, the second coded sequence S2$c$ of coefficients $Y^4_{LH}$, $Y^4_{HL}$, $Y^4_{HH}$, $Y^3_{LH}$, $Y^3_{HL}$, and $Y^3_{HH}$, and the third coded sequence S3$c$ of coefficients $Y^6_{LH}$, $Y^6_{HL}$, $Y^6_{HH}$, $Y^5_{LH}$, $Y^5_{HL}$, and $Y^5_{HH}$. At the end of this procedure, three decoded sequences SD1$_c$, SD2$_c$, and SD3$_c$ are obtained and are thus made available for use by the decoder unit UD, as shown in FIG. 7.

During a following step D2, the decoded coefficients obtained at the end of steps D1$a$, D1$b$, or D1$c$ are rearranged in the opposite order to the order in which they were coded. Said rearrangement step D2 is performed by a calculation software module MADO, as shown in FIG. 7.

In a first example, said decoded coefficients are organized as a single data sequence in the order opposite to that in which they were obtained on coding at the end of the various decomposition iterations.

In a second example, the decoded coefficients are arranged while taking account of the decoded coefficients that correspond to decomposition level 1 all the way to the decoded coefficients that correspond to decomposition level K+1 of the integral image II. For each decomposition level taken into consideration, the resulting decoded coefficients are organized in a corresponding sequence in application of the scan shown in FIG. 6.

During a following step D3 shown in FIG. 8, an inverse DWT is applied directly to the coefficients as decoded and then rearranged as a result of step D2. Step D3 is performed by a calculation module MTIDO shown in FIG. 7.

In the example shown, the calculation module MTIDO uses the inverse Haar wavelet transform.

Figure 9:
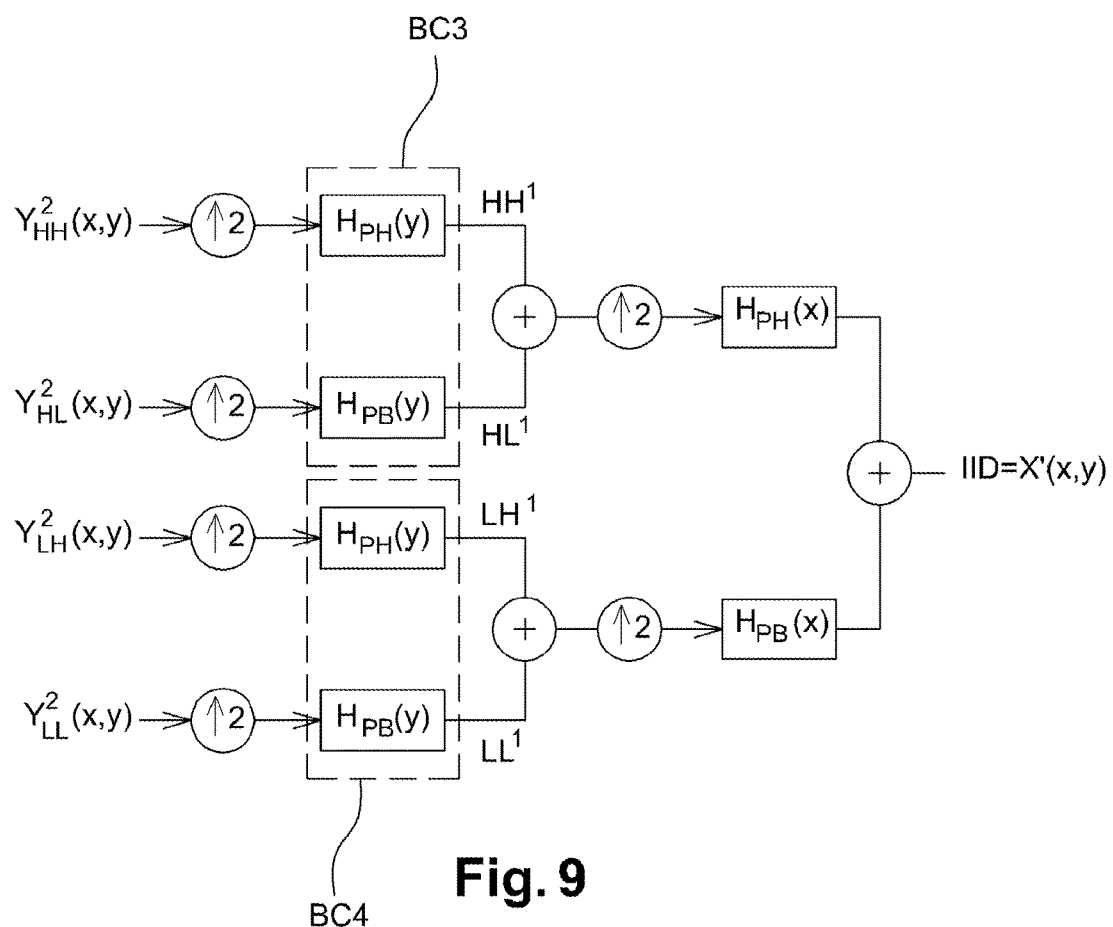
FIG. 9 shows a DWT step that is the inverse of the transform as shown in FIG. 4.

An example of an inverse transform is shown in detail in FIG. 9 for one decomposition level under consideration.

In the example shown, the four decoded sequences $Y^2_{HH}$, $Y^2_{HL}$, $Y^2_{LH}$, and $Y^2_{LL}$ are respectively oversampled by a factor of 2. The two coefficient sequences $Y^2_{HH}$ and $Y^2_{HL}$ as oversampled in this way and the two coefficient sequences $Y^2_{LH}$ and $Y^2_{LL}$ as oversampled in this way are then subjected respectively to the inputs of two filter banks BC3 and BC4, each containing the highpass filters $H_{PH}(y)$ and the lowpass filters $H_{PB}(y)$. The coefficients $HH^1$ and $HL^1$ as delivered by the filter bank BC3 are summed and then subjected to oversampling by a factor of 2. They are then applied as input to a highpass filter $H_{PH}(x)$. In corresponding manner, the coefficients $LH^1$ and $LL^1$ delivered by the filter bank BC4 are summed and then subjected to oversampling by a factor of 2. They are then submitted as inputs to a highpass filter $H_{PB}(x)$.

The two coefficient sequences obtained as respective outputs from the filters $H_{PH}(x)$ and $H_{PB}(x)$ are summed in order to generate the reconstructed integral image IID in the form of a pixel matrix X'(x,y).

The above-described decoding method is reiterated for a plurality of integral images to be reconstructed that belong to a determined sequence.

Naturally, the above-described implementations are given purely by way of non-limiting indication, and numerous modifications may easily be applied by the person skilled in the art without thereby going beyond the ambit of the invention.

The invention claimed is:

1. A method of coding at least one integral image representative of at least one object in perspective in a scene, said method comprising the following acts performed by a coding device:
    applying a discrete wavelet transform directly to said integral image, without first subdividing the integral image into individual viewpoint images, thereby delivering a plurality of transformed coefficients; and
    coding said delivered transformed coefficients.

2. The method of coding according to claim 1, wherein said act of applying a discrete wavelet transform is iterated a plurality of times.

3. The method of coding according to claim 1, wherein the coding of said transformed coefficients is performed in accordance with the MPEG-4 standard.

4. The method of coding according to claim 1, wherein during said coding act, said delivered transformed coefficients are quantified directly and then submitted to entropic coding.

5. The method of coding according to claim 1, wherein, during said coding act, among said delivered transformed coefficients:
    only the delivered transformed coefficients that are representative of an approximation of the integral image are coded in accordance with the MPEG-4 standard; and
    the other delivered transformed coefficients are quantified directly and then subjected to entropic coding.

6. A coder device for coding at least one integral image representative of at least one object in perspective in a scene, said device comprising:
    a non-transitory computer-readable memory comprising program code instructions stored thereon; and
    a computer configured by said code instructions to perform acts comprising:
        applying a discrete wavelet transform directly to said integral image, without first subdividing the integral image into individual viewpoint images, to deliver a plurality of transformed coefficients; and
        coding said delivered transformed coefficients.

7. A non-transmissible computer readable data medium comprising a computer program stored thereon and including instructions for performing a method of coding at least one integral image representative of at least one object in perspective in a scene, when the instructions are executed on a computer, said method comprising:
    applying a discrete wavelet transform directly to said integral image, without first subdividing the integral image into individual viewpoint images, thereby delivering a plurality of transformed coefficients; and
    coding said delivered transformed coefficients.

8. A method of decoding a data signal representative of at least one integral image that has previously been coded, said integral image being representative of at least one object in perspective in a scene, said method comprising the following acts performed by a decoding device:
    decoding the data of said signal, to deliver a plurality of discrete wavelet transform coefficients; and
    directly reconstructing the integral image, without restoring individual viewpoint images of the integral image, by applying an inverse discrete wavelet transform to said delivered discrete wavelet transform coefficients.

9. The method of decoding according to claim 8, wherein said act of applying an inverse discrete wavelet transform is iterated a plurality of times.

10. The method of decoding according to claim 8, wherein the decoding of the data of said signal is performed in accordance with the MPEG-4 standard.

11. The method of decoding according to claim 8, wherein during said decoding act, said delivered transformed coefficients are subjected solely to entropic decoding, and then to inverse quantification.

12. The method of decoding according to claim 8, wherein during said decoding act, from among said delivered transformed coefficients:
    only the delivered transformed coefficients that are representative of an approximation of the integral image are decoded in accordance with the MPEG-4 standard; and
    the other delivered transformed coefficients are subjected directly to entropic decoding, and then to inverse quantification.

13. A decoder device for decoding a data signal representative of at least one integral image that has previously been coded, said device comprising:
    a non-transitory computer-readable memory comprising program code instructions stored thereon; and
    a processor configured by said code instructions to perform acts comprising:
        decoding data of said signal to deliver a plurality of discrete wavelet transform coefficients; and
        directly reconstructing the integral image, without restoring individual viewpoint images of the integral image, by applying an inverse discrete wavelet transform to said delivered discrete wavelet transform coefficients.

14. A non-transmissible computer readable data medium comprising a computer program stored thereon and including instructions for performing a method of decoding a data signal representative of at least one integral image that has previously been coded, when the instructions are executed on a computer, said integral image being representative of at least one object in perspective in a scene, wherein said method comprises:
    decoding the data of said signal, to deliver a plurality of discrete wavelet transform coefficients; and
    directly reconstructing the integral image, without restoring individual viewpoint images of the integral image, by applying an inverse discrete wavelet transform to said delivered discrete wavelet transform coefficients.

* * * * *